(12) United States Patent
Kimura et al.

(10) Patent No.: US 7,700,231 B2
(45) Date of Patent: Apr. 20, 2010

(54) BATTERY AND BATTERY ASSEMBLY

(75) Inventors: Kenji Kimura, Osaka (JP); Tatsuya Hashimoto, Wakayama (JP); Takabumi Fujii, Suita (JP); Seiichi Uemoto, Izumi (JP); Hironori Yukisada, Hirakata (JP); Masatomo Nagatani, Wakayama (JP)

(73) Assignee: Panasonic Corporation, Osaka (JP)

( * ) Notice: Subject to any disclaimer, the term of this patent is extended or adjusted under 35 U.S.C. 154(b) by 966 days.

(21) Appl. No.: 10/500,472

(22) PCT Filed: Dec. 26, 2002

(86) PCT No.: PCT/JP02/13729

§ 371 (c)(1),
(2), (4) Date: Jul. 15, 2004

(87) PCT Pub. No.: WO03/065492

PCT Pub. Date: Aug. 7, 2003

(65) Prior Publication Data

US 2005/0153194 A1     Jul. 14, 2005

(30) Foreign Application Priority Data

Jan. 31, 2002  (JP) .............................. 2002-024253

(51) Int. Cl.
*H01M 2/10* (2006.01)
(52) U.S. Cl. ...................... 429/186; 429/163; 429/164; 429/168; 429/171; 429/185
(58) Field of Classification Search ...................... None
See application file for complete search history.

(56) References Cited

U.S. PATENT DOCUMENTS 4,804,593 A * 2/1989 Hara et al. .................. 429/174
5,663,007 A * 9/1997 Ikoma et al. ................. 429/53
5,900,332 A * 5/1999 Marukawa et al. .......... 429/158

(Continued)

FOREIGN PATENT DOCUMENTS

JP          60-014770          1/1985

(Continued)

OTHER PUBLICATIONS

Machine translation of JP 2000-340210.*

(Continued)

*Primary Examiner*—Dah-Wei Yuan
*Assistant Examiner*—Cynthia Lee
(74) *Attorney, Agent, or Firm*—Greenblum & Bernstein PLC

(57) ABSTRACT

A battery, suitable for forming a battery pack, includes an electrode assembly having a positive electrode plate and a negative electrode plate, and a separator wound or laminated together, core materials of the negative and positive electrode plates being bared respectively at either end. A bottomed cylindrical outer case having a bottom is connected to either end face of the electrode assembly to serve as a battery terminal. Electrolyte is impregnated in the electrode assembly and a lid connected to the other end face of the electrode assembly and fixedly attached to the outer case with a sealer and an insulator interposed therebetween. A connecting part is a part of the lid so that the connecting part engages with and connects to a bottom part of the outer case of another battery.

16 Claims, 7 Drawing Sheets

U.S. PATENT DOCUMENTS

| | | |
|---|---|---|
| 6,524,739 B1 | 2/2003 | Iwaizono et al. |
| 2002/0031705 A1* | 3/2002 | Tucholski .................. 429/163 |
| 2004/0053126 A1 | 3/2004 | Hirano et al. |

FOREIGN PATENT DOCUMENTS

| | | |
|---|---|---|
| JP | 6-5111 | 1/1994 |
| JP | 10-106533 | 4/1998 |
| JP | 11-176412 | 7/1999 |
| JP | 11-176421 | 7/1999 |
| JP | 2000-077103 | 3/2000 |
| JP | 2000-340210 | 12/2000 |
| JP | 2001-093488 | 4/2001 |
| JP | 2001-110371 | 4/2001 |
| JP | 2001-345086 | 12/2001 |

OTHER PUBLICATIONS

English Language Abstract of JP 60-014770.
English Language Abstract of JP 11-176412.
English Language Abstract of JP 2000-077103.
English Language Abstract of JP 2001-345086.
English Language translation of the Claims of JP 6-5111.
English Language Abstract of JP 2001-110371.
English Language Abstract of JP 2001-093488.
English Language Abstract of JP 2000-340210.
English Language Abstract of JP 10-106533.
English Language Abstract of JP 11-176421.

* cited by examiner

Fig. 1
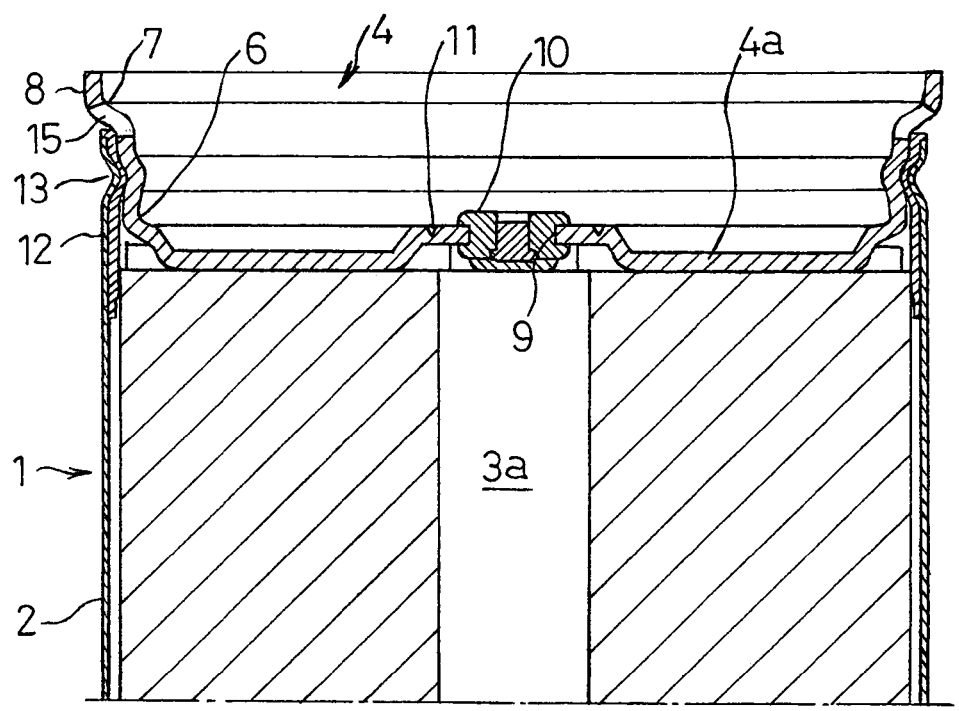
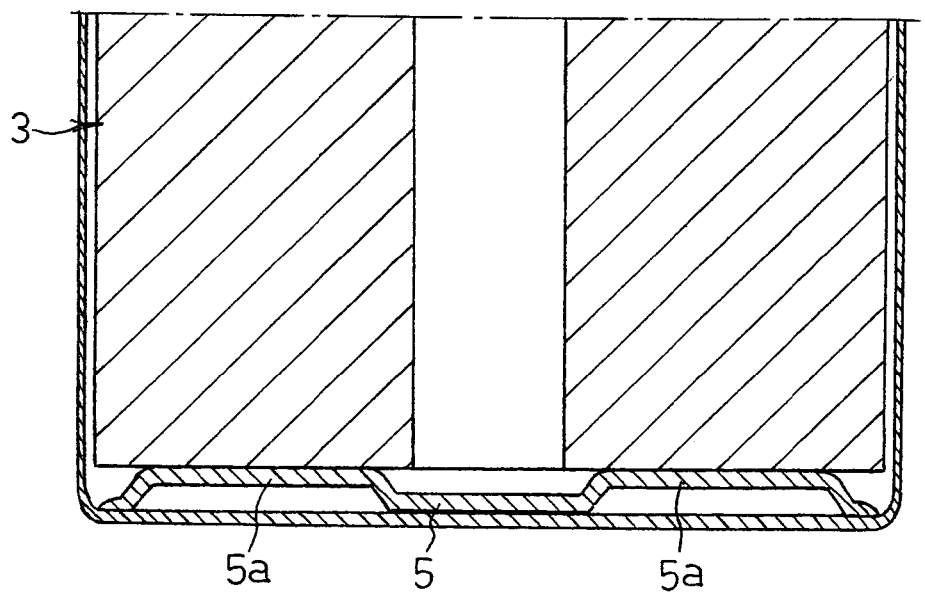

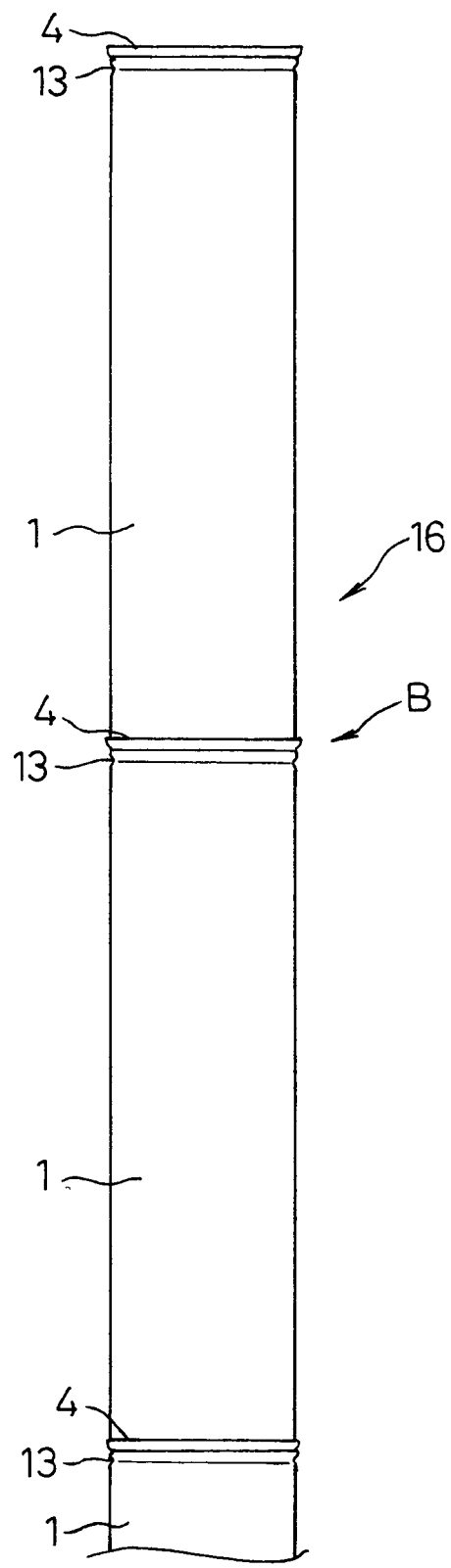

Prior Art

BATTERY AND BATTERY ASSEMBLY

TECHNICAL FIELD

The present invention relates to a battery and more particularly to a battery suitable for forming a battery pack consisting of a plurality of end-to-end connected batteries and a battery pack constructed as such.

BACKGROUND ART

With the growing demands for electric vehicles or hybrid vehicles in view of global environmental problems, rechargeable batteries used as power sources for such vehicles are desired to be smaller and lighter as well as to have higher capacity and power output, and battery packs consisting of a plurality of series-connected battery cells have been used for this application.

One example of the structure of a lithium ion battery that has conventionally been used is described below with reference to FIG. 6. Reference numeral 21 denotes an electrode assembly that is formed by winding together a positive electrode plate 22 consisting of a positive current collector 22b and positive electrode material 22a coated thereon, a negative electrode plate 23 consisting of a negative current collector 23b and negative electrode material 23a coated thereon, and a separator 24 interposed therebetween. Reference numerals 25, 26 respectively denote a positive and a negative current collector plate welded to end faces of the electrode assembly 21. A positive electrode tab 25a is welded to the positive current collector plate 25.

The electrode assembly 21 is accommodated in an outer case 27 with electrolyte, and the negative current collector plate 26 is connected to an inner bottom surface of the case 27 by resistance welding so that the outer case 27 serves as the negative terminal of the battery. Reference numeral 28 denotes a lid having a hole 28a in the center, which is joined to the case by caulking a caulking portion 28b at the outer edge after an O-ring 29, safety vent 30, spacer 31, and cap 32 are inserted therein. The safety vent 30 consists of a thin sheet of aluminum foil and breaks at a hole 31a in the spacer 31 upon an increasing of battery internal pressure above a predetermined level so as to release gas to the outside. The positive electrode tab 25a is welded to this lid 28, so that current from the electrode assembly 21 flows through the caulking portion 28b of the lid 28 to the cap 32, which serves as the positive terminal of the battery. Reference numeral 27a represents a groove formed in the outer case 27 by plastic deformation for determining the position of the lid 28. Reference numeral 33 denotes a gasket interposed between the outer case 27 and lid 28 for providing insulation therebetween; it also provides a seal when the open end edge 27b of the case 27 is caulked such as to sandwich the lid 28.

A plurality of batteries having the above structure are connected in series using suitable connecting members to form a battery pack as shown, for example, in Japanese Patent Laid-Open Publication No. Hei. 10-106533. The structure of the connecting part of this battery pack will be described with reference to FIG. 7. The connecting member 35 is a stepped cup-shaped pressed part including a bottomed small diameter cylindrical portion 36, step 37, and large diameter cylindrical portion 38. The bottom is formed with a hole 39 through which the connection boss on the cap 32 passes, and is in contact with the cap 32 and welded thereto at a plurality of projections or welds 40 by resistance welding. The bottom of the outer case 27 fits into the large diameter cylindrical portion 38 and rests on the step 37, and welded to the large diameter cylindrical portion 38 at a plurality of projections or welds 41 by resistance welding.

With the above structure of the conventional battery and battery pack, however, batteries are connected using the connecting members 35 separately of the battery's lid 28. The assembling process thus includes assembly of the battery pack, mounting of the connecting members 35, and connection of other batteries, i.e., it takes numbers of components and assembling steps and the costs high, resulting in a poor mass productivity.

Another problem is that the electrode assemblies 21 of adjacent batteries are connected to each other via the positive current collector plate 25, the positive electrode tab 25a, the lid 28, the cap 32, the connecting member 35, the outer case 27, and the negative current collector plate 26, i.e., because the current path between the cells is long and includes many connection points, the resistance is accordingly large. The large resistance per cell is a large inhibitor to longer battery life and higher power output.

In view of the problems encountered in the prior art, it is an object of the present invention to provide a battery and a battery pack, which are efficiently mass produced with fewer numbers of assembling steps and components and lower cost, and with which a higher power output is achieved by reducing internal resistance per cell.

DISCLOSURE OF THE INVENTION

A battery according to a first aspect of the present invention includes: an electrode assembly that consists of a positive electrode plate and a negative electrode plate, and a separator wound or laminated together, core materials of the negative and positive electrode plates being bared respectively at either end; a bottomed cylindrical outer case having a bottom being connected to either end face of the electrode assembly to serve as a battery terminal; electrolyte impregnated in the electrode assembly; and a lid connected to the other end face of the electrode assembly and fixedly attached to the outer case with sealing means and insulation means interposed therebetween. The lid includes a connecting part in one piece therewith that engages with and connects a bottom part of the outer case of another battery to be connected, a hole for pouring the electrolyte into the battery, and safety means for releasing gas in response to an increasing of internal pressure. Battery outer cases are connected with each other using the connecting part that is in one piece with the lid, and separate connecting members that were conventionally used for connecting batteries are not necessary. The numbers of assembling steps and components are thereby reduced, the cost is lowered, and mass productivity is improved. Moreover, the battery has higher power output because of the reduced internal resistance per cell.

A battery according to a second aspect of the present invention includes: an electrode assembly that consists of a positive electrode plate and a negative electrode plate, and a separator wound or laminated together, core materials of the positive and negative electrode plates being bared respectively at either end; a bottomed cylindrical outer case having a bottom being connected to either end face of the electrode assembly to serve as a battery terminal; electrolyte impregnated in the electrode assembly; and a lid connected to the other end face of the electrode assembly and fixedly attached to the outer case with sealing means and insulation means interposed therebetween. The lid includes a hole for pouring the electrolyte into the battery and safety means for releasing gas in response to an increasing of internal pressure, and is welded to the bared portion of the core material of one of the electrode plates of the electrode assembly so as to double as a current collector plate. Since the current collector plate and a tab for connecting the plate with the lid are omitted, the numbers of components and weld points are reduced and a cost reduction is achieved. Furthermore, the battery power output is improved because of the reduced current path length and resistance.

The lid may be welded to the bared portion of the core material of one of the electrode plates of the electrode assembly so as to double as a current collector plate in the above battery according to the first aspect of the invention, whereby a cost reduction is achieved and battery power output is further improved.

In the above battery according to the first or second aspect of the invention, the lid may be provided with a projection protruding to the inside of the outer case and welded to the bared portion of the core material of the electrode plate of the electrode assembly with the projection making tight contact therewith. The projection ensures tight contact between the bared core material of the electrode plate and the lid, and reliable welds are formed by performing the welding in this state with small connection resistance.

The outer case and the lid may be joined together by a caulking process performed to the open end of the outer case and a cylindrical portion continuous with the outer periphery of the lid with a gasket being interposed therebetween. Thereby, insulation and a seal are provided between the outer case and the lid with a simple structure and a small number of process steps.

The safety means may be formed as a continuous or discontinuous cut in the lid, which will readily break when the battery internal pressure exceeds a predetermined level; gas release upon pressure increasing is thus ensured with such a simple and low-cost structure.

The electrode assembly and the outer case may be connected by first welding the current collector plate to the bared portion of the core material of one of the electrode plates, which is placed inside the outer case, and then welding the current collector plate to the bottom of the outer case. Similarly to this connection between the electrode assembly and the lid, the outer case may be provided with an inwardly protruding projection in the bottom, which is welded to the bared portion of the core material of the electrode plate of the electrode assembly in the outer case in tight contact therewith. The current collector plate is thereby omitted to achieve a cost reduction because of the reduced numbers of assembling steps and components.

The lid should preferably be formed of a clad plate consisting of a plate material that is resistant to the electrolyte on one side facing the outer case and a plate material that is a same or similar material of the outer case on the other side, so that, while the lid allows a good weld to be formed with the outer case, electrolytic corrosion of the lid is prevented and reliable connection is established with good working properties.

A battery pack according to a third aspect of the present invention is formed by connecting a plurality of batteries having the above structure such that the bottom of the outer case of one battery is fitted into the connecting part of the lid of the other battery and the mating parts are welded together; the battery pack thus formed has high power output because of the reduced internal resistance per cell due to the short current path and fewer connection points.

BRIEF DESCRIPTION OF THE DRAWINGS

FIG. 1 is a longitudinal cross sectional view of a battery according to one embodiment of the present invention;

FIG. 3 is a partial front view of a battery pack formed by connecting the batteries of the above embodiment;

BEST MODE FOR CARRYING OUT THE INVENTION

Figure 2A:
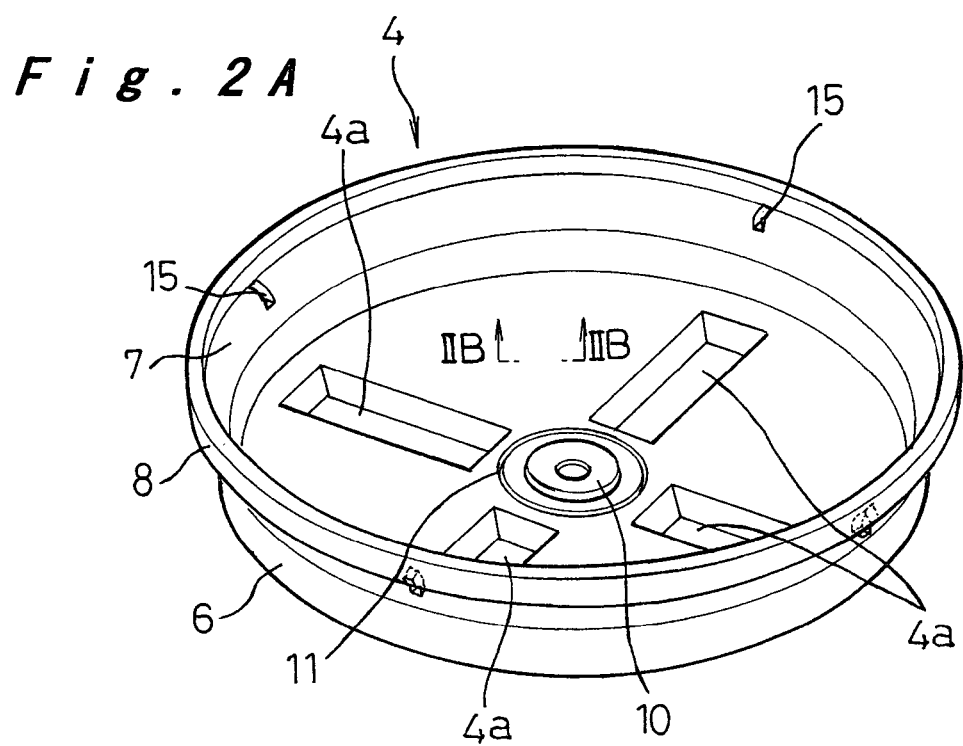
FIG. 2A is a perspective view illustrating a lid of the battery of the above embodiment.

One embodiment of a battery and a battery pack applied as a lithium ion battery according to the present invention will be hereinafter described with reference to FIG. 1 to FIG. 4.

In FIG. 1, reference numeral 1 denotes a battery cell consisting of an electrode assembly 3 accommodated in an outer case 2 with electrolyte and sealed with a lid 4. The outer case 2 is a bottomed cylindrical, deep drawn part of nickel or stainless steel plate that is resistant to the electrolyte.

The electrode assembly 3 is formed by winding together a positive electrode plate and a negative electrode plate with a separator interposed therebetween; the core material of the positive electrode plate is bared at the top end face, and the core material of the negative electrode material is bared at the bottom end face. The positive electrode plate consists of the core material of aluminum foil and positive electrode material containing an active material and a binder coated on both sides of the core material. The active materials for the positive electrode include $LiCoO_2$, $LiMn_2O_4$, or $LiNiO_2$. The negative electrode plate consists of the core material of copper foil and negative electrode material containing an active material and a binder coated on both sides of the core material. The active materials for the negative electrode include graphite, oil cokes, or carbonaceous materials such as carbon fiber. The drawing shows one example in which a wound electrode assembly 3 is accommodated in a cylindrical outer case 2, but the battery may be formed from a laminated assembly of plate-like positive and negative electrode plates with a separator interposed therebetween, accommodated in a prismatic outer case.

For the electrolyte, a solution of lithium salt such as lithium hexafluoro phosphate ($LiPF_6$), lithium perchlorate ($LiClO_4$), or lithium fluoroborate ($LiBF_4$), or a non-aqueous solvent such as ethylene carbonate (EC), propylene carbonate (PC), diethylene carbonate (DEC), or ethylene methyl carbonate (EMC) is used.

A negative current collector plate 5 is welded beforehand to the bared core material of the negative electrode at the bottom end face of the electrode assembly 3. After accommodating the electrode assembly 3 into the outer case 2, a central portion of the negative current collector plate 5 is welded to the center of the bottom of the case 2by resistance welding, through a hollow part 3a or axial bore of the electrode assembly 3. The negative current collector plate 5 has radial projections 5a at a plurality of circumferential locations; when welding the plate 5 to the bared core material of the negative electrode at the end face of the assembly 3 by laser welding or the like, the plate 5 is pressed against the end face of the assembly 3 so that these projections 5a are in tight contact with the core material of the negative electrode.

The lid 4 is a stepped cup-shaped pressed part including a bottomed small diameter cylindrical portion 6, a step 7, and a large diameter connecting cylindrical portion 8, as shown in FIG. 1 and FIG. 2A. A hole 9 for pouring electrolyte is formed at the center in the bottom of the lid 4, which is tightly closed by sealing means 10. An annular cut 11 having a V-shape cross section surrounds the hole 9; this cut 11 forms safety means that releases gas in response to an increasing of internal pressure. Further, radial projections 4a are formed in the bottom of the lid 4 at a plurality of (four in the illustrated example) circumferential locations such as to protrude toward inside of the outer case 2.

The large diameter connecting cylindrical portion 8 of the lid 4 has such a diameter that the bottom of the outer case 2 snugly fits therein and the outer periphery of the bottom of the case 2 rests on the step 7. The bottomed small diameter cylindrical portion 6 of the lid 4 has such a diameter that it is fitted into the open end of the outer case 2, with a gasket 12 that has electrically insulating and sealing properties engaged with the open end edge and inner peripheral face of the case 2; when fitted, there is a slight or no gap between the outer face of the step 7 and the top face of the gasket 12, and the projections 4a at the bottom make tight contact with the bared core material of the positive electrode at the top end face of the electrode assembly 3. With the projections 4a of the lid 4 making tight contact with the bared core material of the positive electrode at the top end face of the electrode assembly 3, the lid 4 is welded from above by laser beam welding or the like.

In the portion where the open end edge of the outer case 2 and the bottomed small diameter cylindrical portion 6 of the lid engage each other with the gasket 12 therebetween, a fixing groove 13 is formed by a drawing process using a suitable jig from outside the case 2; the outer case 2 and the lid 4 are fixed to each other with the gasket 12 by this fixing groove 13.

Figure 2B:
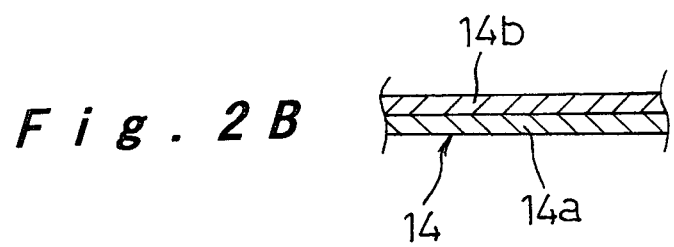
FIG. 2B is a cross section taken along the line IIB-IIB of FIG. 2A.

The lid 4 is formed of clad metal 14 of two different materials bonded together by cold welding as shown in FIG. 2B; one side that faces the outer case 2 is made of an aluminum or aluminum alloy plate 14a that is resistant to the electrolyte similarly to the core material of the positive electrode plate, and the other side is made of a nickel or stainless steel plate 14b that is resistant to the electrolyte.

The lid 4 further includes outlets 15 at a plurality of (four in the illustrated example) circumferential locations extending from a position above the fixing groove 13 of the bottomed small diameter cylindrical portion 6 over the step 7 to the bottom of the large diameter connecting cylindrical portion 8, so as to release gas to the outside of the battery 1 when the safety means 11 operates.

The battery 1 having the above structure is produced as follows: The electrode assembly 3 is fabricated, and the negative current collector plate 5 is welded to the bared core material of the negative electrode at one end face of the assembly. The assembly 3 is then accommodated in the outer case 2, and the negative current collector plate 5 is welded to the bottom of the case 2 by resistance welding. The gasket 12 is arranged to fit into the open end of the outer case 2, and the bottomed small diameter cylindrical portion 6 of the lid 4 is fitted into the open end of the case 2 and pressed toward the electrode assembly 3. The outer case 2 is swaged in this state at its open end from outside to form the fixing groove 13, 50 that the outer case 2 and the lid 4 are fixedly coupled with the gasket 12 therebetween in an electrically insulated and tightly sealed manner. Since the projections 4a of the lid 4 are making tight contact with the bared core material of the positive electrode at one end face of the electrode assembly 3 in this state, laser beam welding or the like is performed from outside the lid 4 to weld the projections 4a to the positive electrode core material. A predetermined amount of electrolyte is poured into the case through the hole 9 in the lid 4 so that the electrode assembly 3 is impregnated therewith, after which the hole 9 is tightly sealed with the sealing means 10, to complete the battery 1.

Figure 4:
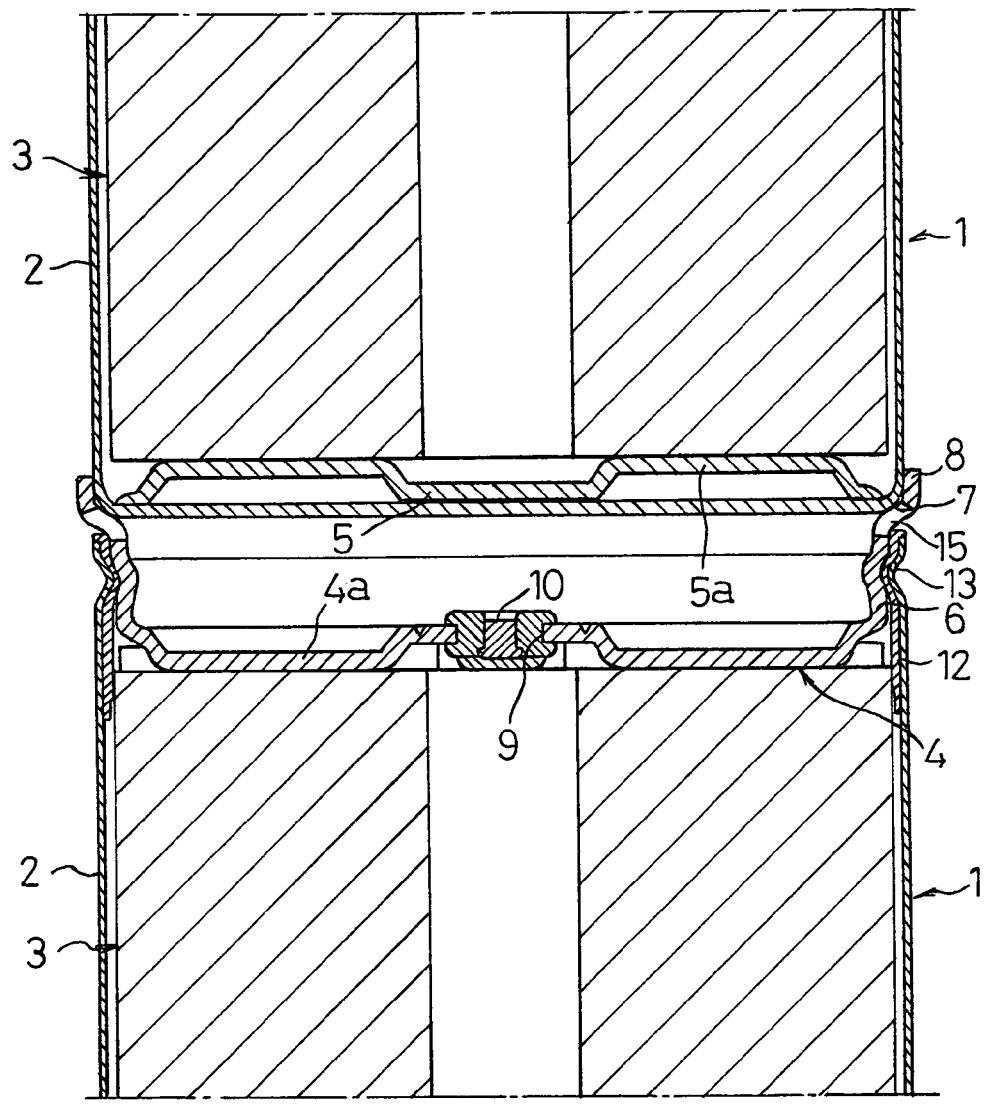
FIG. 4 is a longitudinal cross sectional view illustrating the part B of FIG. 3 in detail.

A plurality of batteries 1 having the above structure are connected in series to form a battery pack 16 shown in FIG. 3. One battery pack 16 is formed in the following manner: As shown in FIG. 4, the bottom of the outer case 2 of one battery 1 is fitted into the large diameter connecting cylindrical portion 8 of the lid 4 of the other battery 1 such that the outer periphery of the bottom of the outer case 2 rests on the step 7. The large diameter connecting cylindrical portion 8 is welded to the outer periphery of the bottom of the outer case 2 in this state so that they are electrically connected and mechanically coupled. The welding may be laser beam welding, or resistance welding, in which case projections are provided at a plurality of circumferential locations of the large diameter connecting cylindrical portion 8.

According to this embodiment, the lid 4 includes the integral large diameter connecting cylindrical portion 8 that couples to and connects the bottom of the outer case 2 of the other battery 1 to be connected, i.e., the connecting part for connecting the outer case 2 of the other battery 1 is in one piece with the lid 4, so that separate connecting members that were conventionally used for connecting batteries 1, 1 are not necessary. The numbers of assembling steps and components are thereby reduced, the cost is lowered, and mass productivity is improved. Moreover, the battery 1 has higher power output because of the reduced internal resistance per cell.

Moreover, because the lid 4 is welded to the bared positive electrode core material at the top end face of the electrode assembly 3 so as to double as the positive current collector plate, a separate positive collector plate and a tab for connecting the plate and the lid 4 are omitted, leading to a further reduction in the number of components and weld points, whereby cost reduction is achieved and power output is improved because of the reduced length of current path and resistance. Further, the lid 4 includes projections 4a that protrude toward inside of the outer case 2 so as to ensure that they make tight contact with the bared positive electrode core material of the electrode assembly when welding is performed, whereby reliable welds are formed because of the low connection resistance.

The lid 4 is fixedly joined to the open end of the outer case 2 by the fixing groove 13 that is formed by swaging, with the gasket 12 interposed between the open end of the case 2 and the bottomed small diameter cylindrical portion 6 of the lid 4. Insulation and a seal are thereby provided between the outer case 2 and the lid 4 with a simple structure and a small number of process steps.

The lid 4 is made of a clad plate 14 consisting of an aluminum or aluminum alloy plate 14a that is resistant to the electrolyte on the side facing the outer case 2 and a nickel or stainless steel plate 14b on the other side, so that, while the lid allows a good weld to be formed with the outer case 2, electrolytic corrosion of the lid 4 is prevented, and reliable connection is achieved with good working properties.

The safety means is formed by a continuous or discontinuous cut 11 having a V-shape cross section in the lid 4; with such a simple and low-cost structure, it is ensured that gas is released from the battery in the event that the internal gas pressure of the battery 1 exceeds a predetermined level, as the cut breaks upon the increasing of internal pressure. The limit at which the cut 11 breaks to release gas from inside the battery 1 is controlled precisely so as to ensure safety by forming the cut 11 solely from the aluminum or aluminum alloy plate 14a with a predetermined thickness because aluminum is relatively low in strength while the nickel or stainless steel plate 14b has high strength; the latter is thus removed from the clad plate 14 forming the lid 4 at the portion where the cut 11 is provided.

The battery pack 16 according to this embodiment is formed by connecting a plurality of batteries 1 having the above structure such that the bottom of the outer case 2 of one battery 1 is fitted into the large diameter connecting cylindrical portion 8 of the lid 4 of the other battery and the mating parts are welded together; the battery pack 16 thus has high power output because of the reduced internal resistance per cell due to the short current path and fewer connection points.

Figure 5:
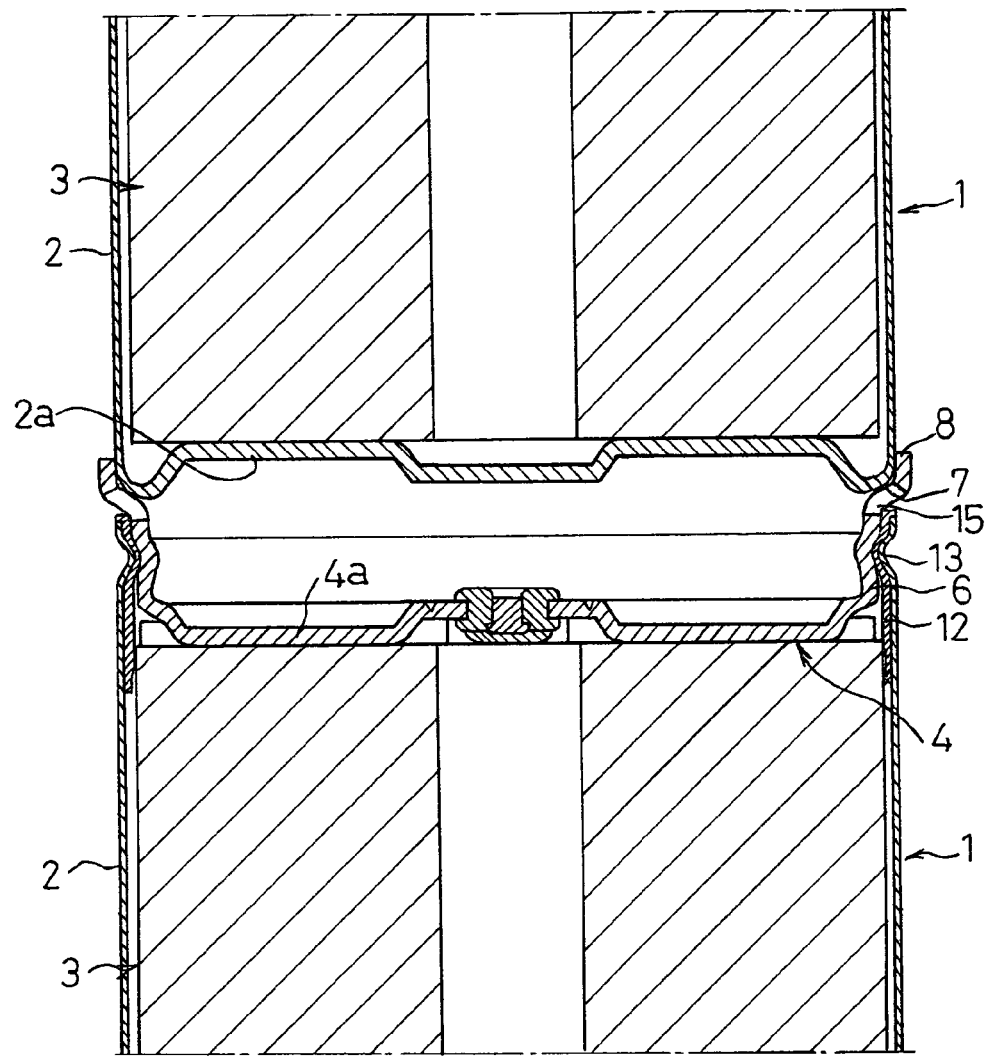
FIG. 5 is a longitudinal cross sectional view of the above battery with an alternative structure.
Figure 6:
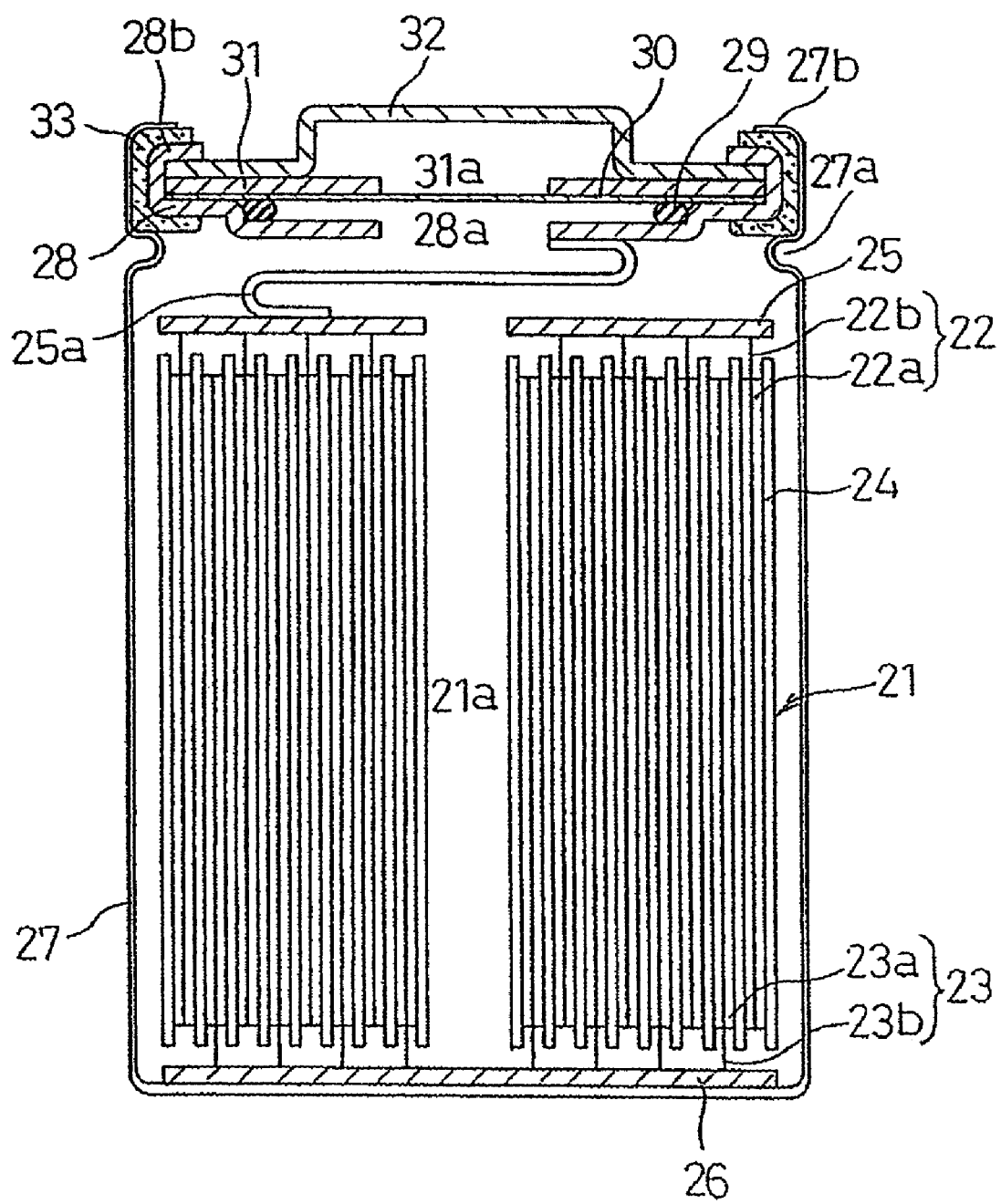
FIG. 6 is a longitudinal cross sectional view of a conventional battery.
Figure 7:
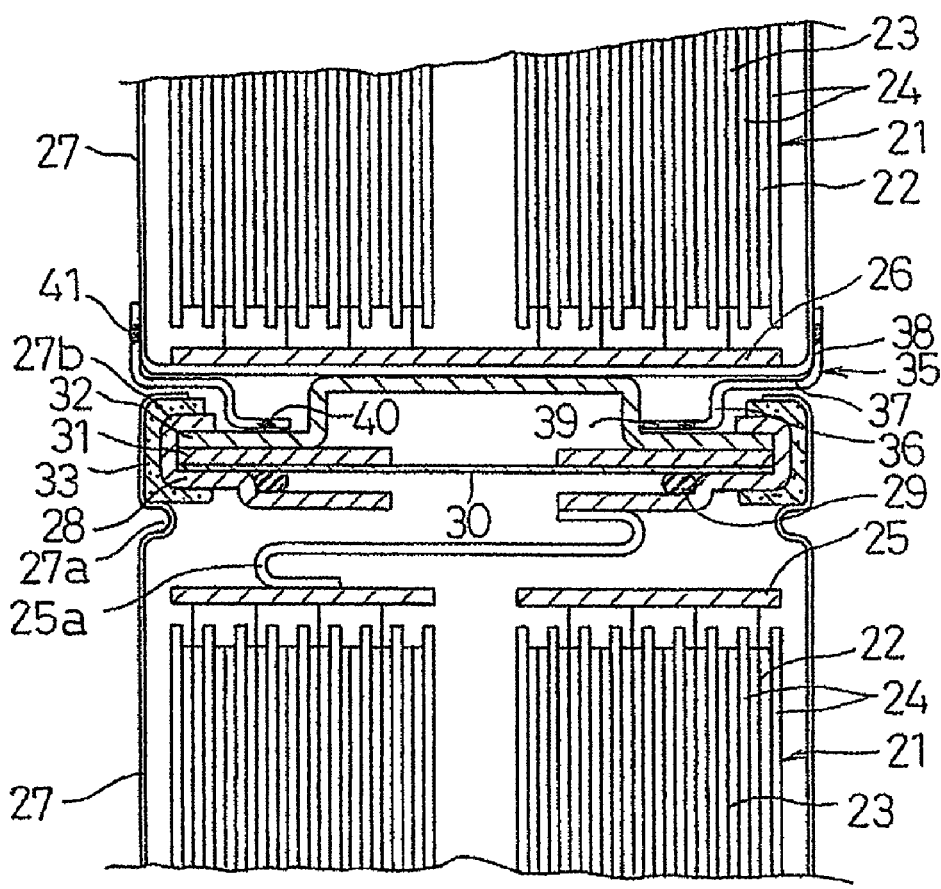
FIG. 7 is a longitudinal cross sectional view of the connecting part of a battery pack formed by connecting the conventional batteries.

The above embodiment shows one example in which the electrode assembly 3 is accommodated in the outer case 2 with the negative current collector plate 5 welded to the core material of the negative electrode plate of the electrode assembly 3 and to the bottom of the outer case 2; one alternative is to provide an inward projection 2a in the bottom of the outer case 2 as shown in FIG. 5, which is to make tight contact with and welded to the bared negative electrode core material of the assembly 3 inside the outer case 2.

By thus providing a projection 2a in the bottom of the outer case 2 and welding it to the bared negative electrode core material of the assembly 3 in tight contact therewith, the negative current collector plate 5 is omitted, leading to a further reduction in the numbers of assembling steps and components, and to a further cost reduction.

The above embodiment shows one example in which the connecting part between the lid 4 and the outer case 2 is the large diameter connecting cylindrical portion 8 that is formed in one piece with the lid 4, but it need not necessarily be cylindrical and may be a plurality of circumferentially arranged tongues with suitable spacing protruding from the step 7 or the top of the bottomed small diameter cylindrical portion 6.

While the lid 4 is made as the positive side and the outer case 2 the negative side in the above description, this arrangement may be reversed, i.e., the lid 4 may be the negative side and the outer case 2 the positive side, in which case the outer case 2 will be made of aluminum or aluminum alloy.

Further, while the description of the above embodiment is given only with respect to the case in which the battery 1 is a lithium ion battery, the present invention is also applicable to other types of batteries such as nickel metal hydride batteries with the same effects.

INDUSTRIAL APPLICABILITY

According to the battery of the present invention, the lid fixedly attached to the outer case includes an integral connecting part that couples to and connects the bottom of the outer case of another battery to be connected, i.e., the connecting part for connecting the outer case of another battery is in one piece with the lid, so that separate connecting members that were conventionally used for connecting batteries are not necessary. The numbers of assembling steps and components are thereby reduced, the cost is lowered, and mass productivity is improved. Moreover, the battery has higher power output because of the reduced internal resistance per cell.

Furthermore, according to the battery of the present invention, a plurality of batteries having the above structure are connected to each other such that the bottom of the outer case of one battery is fitted into the connecting part of the lid of the other battery and the mating parts are welded together; the battery pack thus formed has high power output because of the reduced internal resistance per cell due to the short current path and fewer connection points.

The invention claimed is:

1. A battery comprising:
an electrode assembly comprising a positive electrode plate, a negative electrode plate and a separator wound or laminated together, core materials of the positive and negative electrode plates being bared at ends of the electrode assembly;
a cylindrical outer case having a bottom connected to an end face of the electrode assembly to serve as a battery terminal;
electrolyte impregnated in the electrode assembly; and
a lid connected to another end face of the electrode assembly and attached to the outer case,
wherein the lid includes a cylindrical portion, a connecting part in one piece therewith that engages with and connects to a bottom part of an outer case of another battery to be connected, a hole configured to receive the electrolyte into the battery, and a safety structure that releases gas in response to a build-up of internal pressure,
the lid is fixed to the outer case of the battery by a fixing groove formed on the lid and the outer case at a position where a gasket is interposed between the outer case of the battery and the cylindrical portion of the lid,
and the lid directly contacts and is directly welded to the bared portion of the core material of one of the electrode plates of the electrode assembly.

2. A battery comprising:
an electrode assembly comprising a positive electrode plate, a negative electrode plate and a separator wound or laminated together, core materials of the positive and negative electrode plates being bared at ends of the electrode assembly;
a cylindrical outer case having a bottom connected to an end face of the electrode assembly to serve as a battery terminal;
electrolyte impregnated in the electrode assembly; and
a lid connected to another end face of the electrode assembly and attached to the outer case,
wherein the lid includes a cylindrical portion, a connecting part in one niece therewith that engages with and connects to a bottom part of an outer case of another battery to be connected, a hole configured to receive the electrolyte into the battery and a safety structure that releases gas in response to an increase in internal pressure,
the lid is fixed to the outer case of the battery by a fixing groove formed on the lid and the outer case at a position where a gasket is interposed between the outer case of the battery and the cylindrical portion of the lid,
and the lid directly contacts and is directly welded to the bared portion of the core material of one of the electrode plates of the electrode assembly to serve as a first current collector plate.

3. The battery according to claim 2, wherein the lid is provided with a projection protruding to the inside of the outer case, and is welded to the bared portion of the core material of the electrode plate of the electrode assembly with the projection making tight contact therewith.

4. The battery according to claim 1, wherein the safety structure comprises a continuous or discontinuous cut in the lid.

5. The battery according to claim 1, wherein a current collector plate is welded to the bared portion of the core material of one of the electrode plates of the electrode assembly, and after placing the electrode assembly in the outer case, the current collector plate is welded to the bottom of the outer case.

6. The battery according to claim 1, wherein the outer case is provided with an inwardly protruding projection, which is welded to the bared portion of the core material of one of the electrode plates of the electrode assembly in the outer case in tight contact therewith.

7. The battery according to claim 1, wherein the lid comprises a clad plate comprising a plurality of plate materials, wherein one of the plate materials which faces the outer case is resistant to the electrolyte.

8. A battery pack of a plurality of the batteries according to claim 1, the bottom of the outer case of one battery being fitted into the connecting part of the lid of the other battery and their mating parts being welded together.

9. The battery according to claim 1, wherein the lid is provided with a projection protruding to the inside of the outer case, and is welded to the bared portion of the core material of the electrode plate of the electrode assembly with the projection making tight contact therewith.

10. The battery according to claim 2, wherein the safety structure comprises a continuous or discontinuous cut in the lid.

11. The battery according to claim 2, wherein a second current collector plate is welded to the bared portion of the core material of one of the electrode plates of the electrode assembly, and after placing the electrode assembly in the outer case, the second current collector plate is welded to the bottom of the outer case.

12. The battery according to claim 2, wherein the outer case is provided with an inwardly protruding projection, which is welded to the bared portion of the core material of one of the electrode plates of the electrode assembly in the outer case in tight contact therewith.

13. The battery according to claim 2, wherein the lid is formed of a clad plate comprising a plurality of plate materials, wherein one of the plate materials which faces the outer case is resistant to the electrolyte.

14. A battery pack of a plurality of the batteries according to claim 1, the bottom of the outer case of one battery being fitted into the connecting part of the lid of the other battery and their mating parts being welded together.

15. The battery according to claim 1, wherein the lid comprises another cylindrical portion, integrally formed in the lid, which is shaped to receive and connect to a bottom of another battery.

16. The battery according to claim 2, wherein the lid comprises another cylindrical portion, integrally formed in the lid, which is shaped to receive and connect to a bottom of another battery.

* * * * *

UNITED STATES PATENT AND TRADEMARK OFFICE
CERTIFICATE OF CORRECTION

PATENT NO. : 7,700,231 B2 Page 1 of 1
APPLICATION NO. : 10/500472
DATED : April 20, 2010
INVENTOR(S) : K. Kimura It is certified that error appears in the above-identified patent and that said Letters Patent is hereby corrected as shown below:

At column 8, line 52 (claim 2, line 14) of the printed patent, please replace "niece" with -- piece --.

Signed and Sealed this

Third Day of August, 2010

David J. Kappos
*Director of the United States Patent and Trademark Office*